United States Patent
DeLand

[19]

[11] Patent Number: 6,015,133
[45] Date of Patent: Jan. 18, 2000

[54] FUEL VAPOR MANAGMENT VALVE

[75] Inventor: Daniel L. DeLand, Davison, Mich.

[73] Assignee: Eaton Corporation, Cleveland, Ohio

[21] Appl. No.: 09/300,286

[22] Filed: Apr. 27, 1999

[51] Int. Cl.[7] .............................. F16K 31/40; F02M 33/02
[52] U.S. Cl. ........................ 251/30.01; 251/45; 251/118
[58] Field of Search ............................. 251/30.02, 30.01, 251/45, 118

[56] References Cited

U.S. PATENT DOCUMENTS

| | | | |
|---|---|---|---|
| 5,277,167 | 1/1994 | DeLand et al. | 123/518 |
| 5,429,099 | 7/1995 | DeLand | 123/520 |
| 5,467,960 | 11/1995 | Morris et al. | 251/30.01 |
| 5,853,018 | 12/1998 | DeLand et al. | 137/15 |
| 5,855,355 | 1/1999 | Grunert et al. | 251/118 X |
| 5,878,725 | 3/1999 | Osterbrink | 251/30.01 X |

*Primary Examiner*—Kevin Lee
*Attorney, Agent, or Firm*—Roger A. Johnston

[57] ABSTRACT

An electrically controlled vacuum operated fuel vapor canister purge valve having a regulator valve subassembly with a vacuum signal chamber on one side of a pressure responsive power diaphragm which moves a regulator valve obturator for controlling flow from a vapor inlet passage to a vapor outlet passage for connection to an engine inlet. The vacuum signal chamber has a vacuum signal connection port and a recess or well with an atmospheric vent port and resiliently deflectable locking tab. A solenoid operated atmospheric bleed valve has a boss with a restrictor outlet which is quick-connected and seated in the well for electrically controlling vent flow into the vacuum signal chamber. The restrictor limits atmospheric bleed flow to attenuate the effects of sudden changes in the vacuum signal.

7 Claims, 3 Drawing Sheets

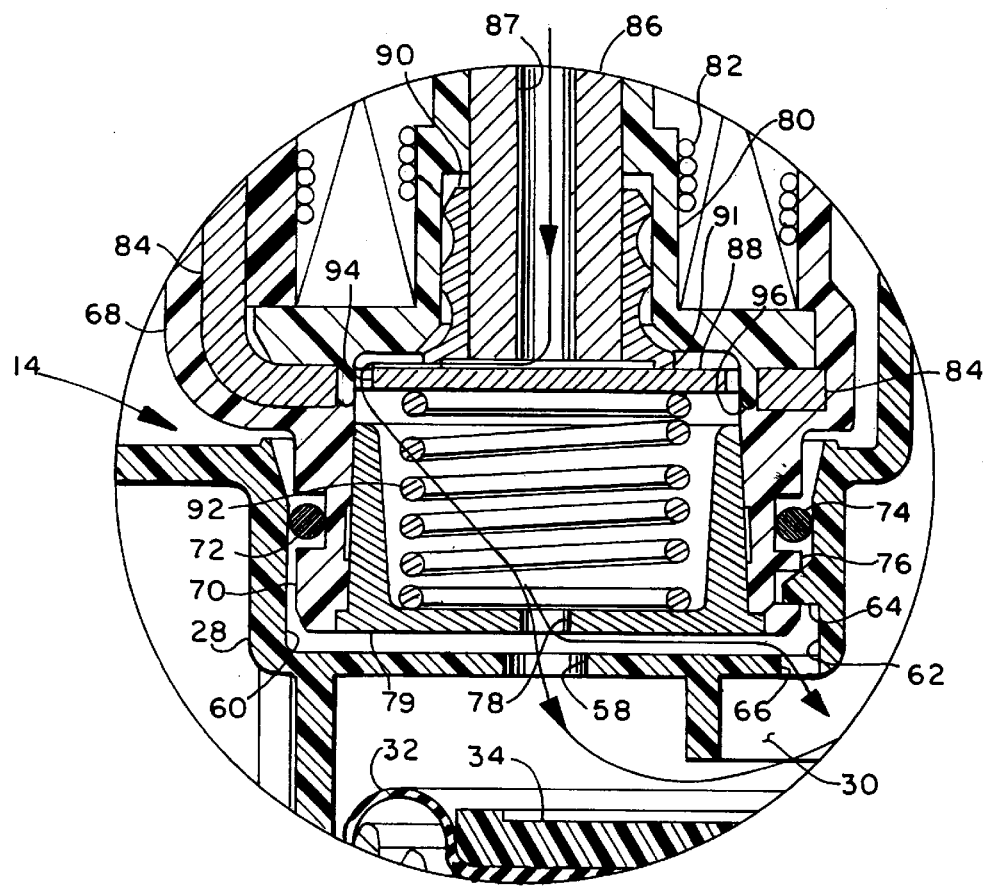
_Fig. 2_
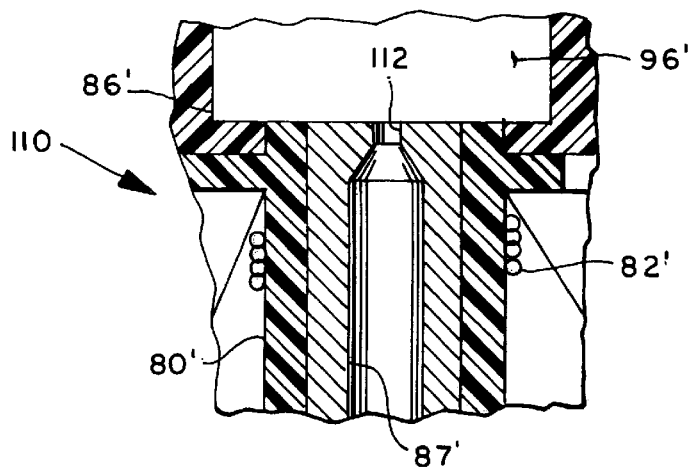
_Fig. 3_

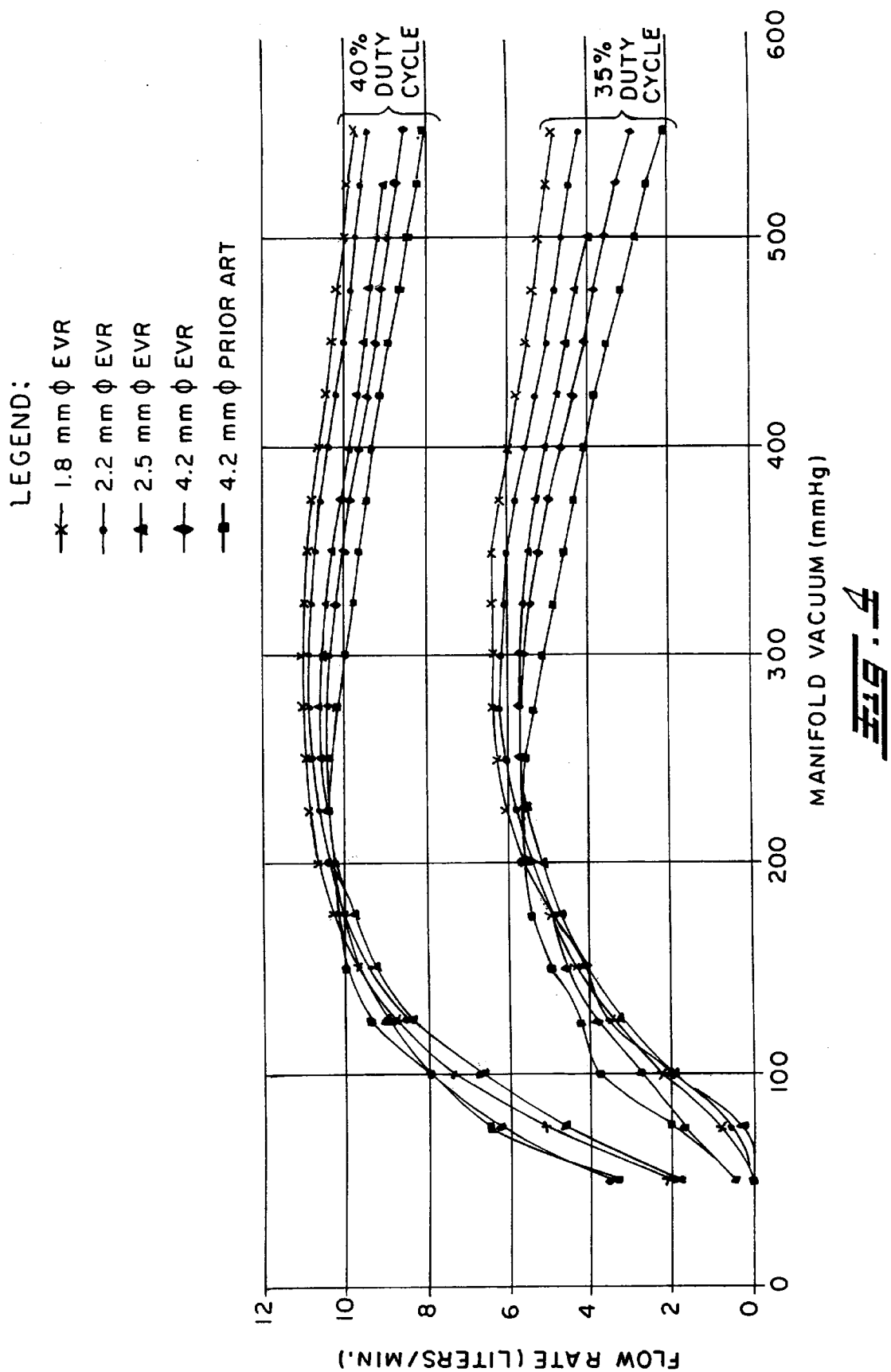

6,015,133

FUEL VAPOR MANAGMENT VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to valves of the type employed for controlling purging of fuel vapor stored in a canister connected to receive vapors from a vehicle fuel tank and for introducing the vapor purge flow into the inlet of the vehicle engine. Such valves are known in the art and typically utilize a vacuum signal such as from the engine manifold, to control the pressure on one side of a power diaphragm employed to control the movement of a valving member or obturator with respect to a valve seat or port for controlling flow of the vapor between the canister and the engine inlet. In order to provide electrical control of the vapor purge flow to the engine inlet where the engine operation is controlled by electrically actuated fuel injectors an electrically operated valve is employed to control atmospheric bleed to a vacuum signal chamber on one side of the power diaphragm.

However, vapor management valves of the aforesaid type employing a vacuum generated control signal for the power diaphragm are effected by changes in the engine manifold vacuum. When the engine throttle is closed, from an engine loaded condition, a strong manifold vacuum is applied through the regulator valve outlet to the underside of the power diaphragm. The restrictor in the vacuum signal port causes a lag in the corresponding vacuum level being created above the power diaphragm in the vacuum signal chamber; and, therefore the diaphragm is moved downwardly by the pressure differential to substantially decrease the vapor purge flow to the engine inlet. This condition is sometimes referred to as "tip-out" and can result in an overly lean fuel/air mixture and can cause engine stalling, particularly at engine idle.

It has thus long been desired to provide a way or means of providing for improved control of fuel vapor canister purge in a vehicle engine emission control system and to provide such improved control a relatively low cost and an easy to manufacture valve and to provide for electrical control of the purge valve in a manner which can accommodate or compensate for changes in engine manifold vacuum as experienced when the throttle is closed during engine operation.

BRIEF SUMMARY OF THE INVENTION

It is an object of the present invention to provide an easy to manufacture and relatively low cost electrically operated fluid pressure signal actuated vapor management valve for controlling flow of fuel vapor purge from a canister to an engine inlet.

It is a further object of the present invention to provide an electrically operated fluid pressure actuated vapor management valve which is low in manufacturing costs and easy to assemble and which can accommodate numerous different flow conditions for different engine applications without requiring redesign or retooling of the valve assembly.

It is a further object of the present invention to provide an electrically operated fluid pressure actuated fuel vapor management valve which can utilize a single electrically operated vent valve for numerous different flow requirements of various different engines without the need for significant modifications of the valve.

It is a further object of the present invention to provide a solenoid operated vent valve for controlling atmospheric bleed flow to the vacuum signal pressure chamber of a vapor management valve for controlling the differential pressure across a power diaphragm for moving the fuel vapor purge valve and controlling flow from the canister to the engine inlet.

The present invention provides a fuel vapor canister purge valve which employs a vacuum signal actuated diaphragm operated regulator valve for controlling flow from the canister to an engine inlet. The valve of the present invention has the regulator housing provided with a vent port in a recess or well which has a solenoid operated vent or atmospheric bleed valve (EVR) quick-connected therein. A restrictor is provided upstream of the vent port in the regulator housing and preferably in the outlet of the EVR for controlling flow to the vent port in the regulator housing and particularly to prevent or delay loss of vacuum in the signal pressure chamber. Alternatively the EVR may have the restrictor located at its inlet. The restrictor in the outlet of the solenoid operated vent valve or EVR may be easily changed during manufacture; and, the flow characteristics of the vent valve thereby changed to accommodate different engine applications. The design and structure of the regulator valve thus may be common to many different applications.

The valve arrangement of the present invention enables use of a common regulator valve for mounting on engines with the different purge flow requirements to be accommodated by merely changing the outlet port size in the solenoid vent valve (EVR) which is preferably quick-connected to the regulator housing.

BRIEF DESCRIPTION OF THE DRAWINGS

FIG. 2 is an enlarged view of a portion of the valve assembly of FIG. 1;

FIG. 3 is an enlarged view of an alternate embodiment of the vent valve of the invention of FIG. 1; and, FIG. 4 is a graph of vapor purge flow rate plotted as a function of engine manifold vacuum for the valve assembly of FIG. 1.

DETAILED DESCRIPTION OF THE INVENTION

Figure 1:
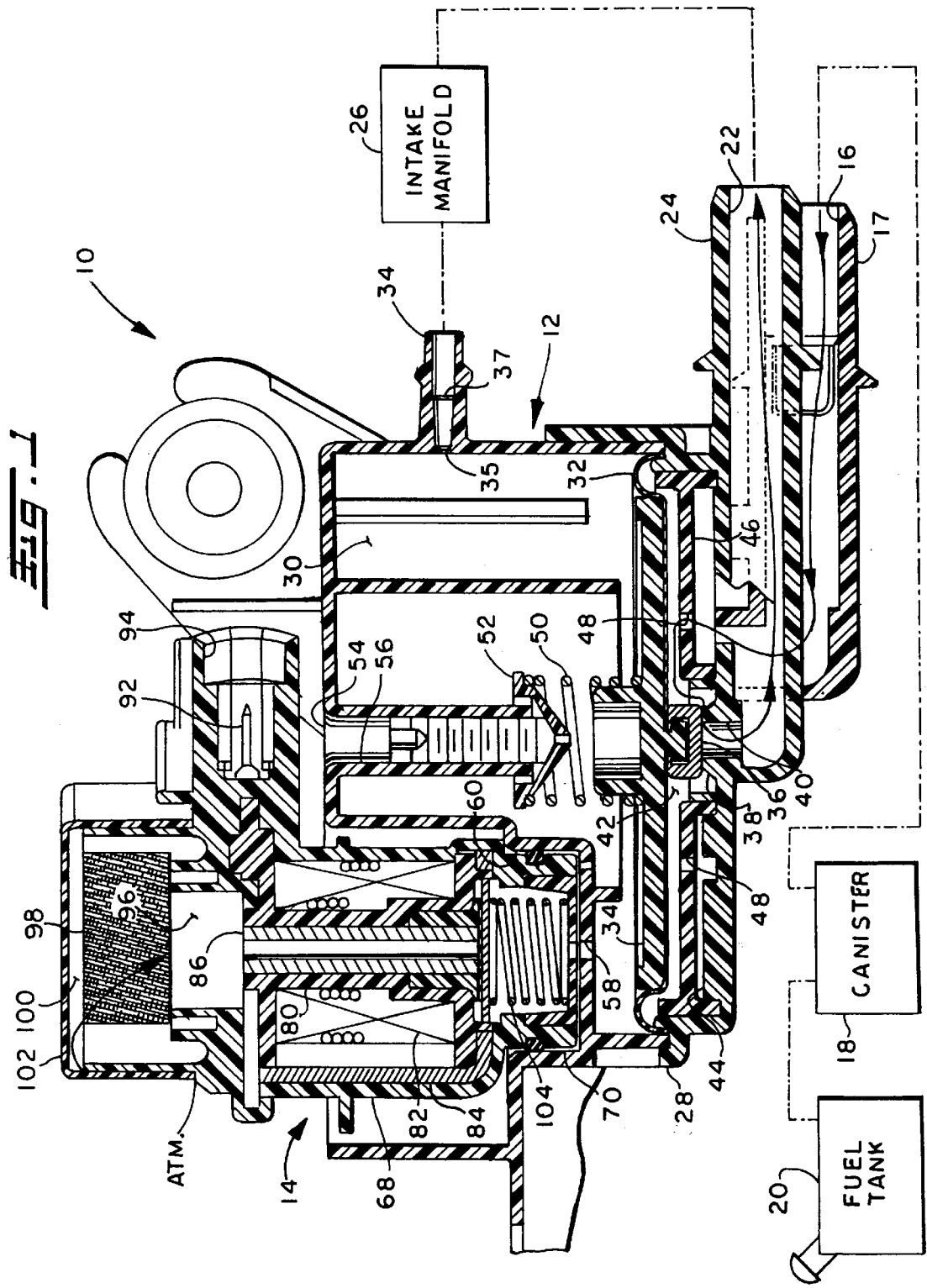
FIG. 1 is a cross-section of the valve assembly of the present invention and shows, in dashed outline, the system connections thereto.

Referring to FIG. 1, the valve assembly of the present invention is indicated generally at 10 and includes a regulator valve subassembly indicated generally at 12 and an electrically operated vent or atmospheric bleed valve indicated generally at 14. The regulator valve subassembly has an inlet 16 which is adapted for connection to a fuel vapor canister 18 which receives fuel vapors from a fuel tank 20 as indicated in dashed line. The regulator valve subassembly outlet 22 is formed in a connector fitting 24 which is adapted for connection to the engine inlet manifold 26 via a hose indicated by dashed line in FIG. 1. The regulator valve subassembly 12 includes a housing structure 28 defining therewithin a vacuum signal chamber 30 which has one wall thereof formed by a pressure responsive diaphragm 32. Housing structure 28 has a vacuum connector 34 which is adapted for connection to the manifold 26 via a hose indicated by dashed line in FIG. 1. Connector 34 has restricting orifices 35, 37 therein to provide reduced flow and prevent sonic choking. Diaphragm 32 has an insert or backing plate 34 provided on the upper surface thereof; and, the vacuum plate has a portion thereof extending through the diaphragm which portion has provided thereon a resilient poppet 36 which is moveable with the diaphragm 32 with respect to a valve seat 38 formed in the housing and ported through a passage 40 to the outlet passage 22.

The diaphragm forms a pressure regulator valving passage 42 underneath the diaphragm and in conjunction with the bottom wall 44 of the housing 28; and, if desired a baffle plate 46 having a plurality of surge preventing apertures 48 formed therein is disposed in a chamber 42.

The diaphragm 32 and backing plate 34 are biased downwardly in a direction tending to urge poppet 36 against valve seat 38 by the lower end of a spring 50, the upper end of which is registered on a keeper or retainer 52 which is registered against an adjustment screw 54 threadedly engaged in a bore 56 provided in the upper portion of the housing 28.

The regulator housing 28 has a vent port 58 located in a recess or well 60 formed in the upper portion of housing 28. Well 60 has formed therein at least one locking tab 62 as shown in FIG. 2 which has a shoulder or projection 64 provided thereon and which is locked over lug 76 on boss 70 preferably rotatably or twist-locking. In order to form the locking tab 62 it is necessary to provide a relief or cut-out 66 in the bottom of the recess or well 60 for mold pins or slides during molding of body 28.

The cut-out 66 forms an additional vent port to the signal chamber 30 in addition to the vent port 58, thus, it is virtually impossible to provide accurate flow limitation in the venting of the chamber 30 to the atmosphere in the construction of the housing 28.

The electrically preferably solenoid operated vent or bleed valve or EVR 14 has a body 68 which has formed on the lower end thereof a boss 70 which has formed thereon an annular groove 72 into which is received an annular seal ring 74 for sealing between the boss 70 and recess 60. The boss 70 has formed on one side thereof a projection or lug 76 which is operative, upon insertion of the boss 70 into recess 60 to be twist-locked on projection 64, thereby retaining the valve body 68 in position in the recess 60.

The body 68 of EVR 14 has formed in the end of boss 70 a flow restricting orifice 78 which serves to restrict flow of atmospheric bleed air into the recess 60. Recess 60 is sealed by ring 72 and thus the orifice 78 restricts all bleed flow through vent port 58 and cut-out 66 to the chamber 30. Flow restricting orifice 78 is shown in the embodiment of FIG. 2 as formed in an insert 79, but may also be formed integrally as one piece with body 68 of EVR 14.

EVR 14 has a coil bobbin 80 with a coil 82 of electrical conductive material, such as magnet wire, wound therearound; and, coil 82 is surrounded by a ferromagnetic flux carrier or pole frame 84. The bobbin has a tubular ferromagnetic pole piece 86 disposed centrally therein. A moveable armature 88 is disposed adjacent the lower end of the pole piece 86 and registers against a non-magnetic stop member 90 having the form of a sleeve with an annular flange formed thereabout and disposed about the pole piece 86. Armature 88 preferably has notches or peripheral cutouts 94 for facilitating flow therearound. Coil 82 has the ends thereof connected to suitable electrical terminals, one of which is shown in FIG. 2 and denoted by reference numeral 92 which extends outwardly into a receptacle 94 formed in the EVR body 68.

Referring to FIG. 1, pole piece 86 has the bore 87 thereof communicating with a chamber 96 which is covered by a filter 98 which communicates with a plenum 100 formed under cap 102. Plenum 100 communicates, through a clearance formed around the inner periphery of cap 102 with the atmosphere as indicated in FIG. 1 by the black arrow.

Referring to FIG. 2, armature plate is biased upwardly toward sleeve flange 91 by a spring 22.

In operation, with a vacuum drawn in chamber 30, and the recess 96 of boss 70, the pressure differential on armature plate 88 effects a net downward force on the armature plate overcoming the bias of the spring 104 and effects opening of the bore 87 to permit atmospheric flow from plenum 100 and chamber 96 to restrictor passage 78.

Energization of the coil 82 imposes an electromagnetic force in an upward direction on the armature plate 88 and changes the upward bias force comprising the sum of the electromagnetic force and the spring bias on the armature 88. The downward force on armature 88 comprises the differential pressure of the atmosphere above the armature and the vacuum in chamber 96 acting over the area of armature 88 within the diameter of flange 91. It will be understood that the net force, i.e., the vector sum of the upward and downward forces determines the movement of the armature with respect to flange 91; and, thus the flow through orifice 78 and the vacuum in the recess 96 and chamber 30, which acts on the diaphragm 32.

Referring to FIG. 4, a family of flow curves are presented for various sizes of the flow restricting orifice 78 as a function of engine manifold vacuum for two different levels of duty cycle for the electrical signal to coil 82. The upper family of curves in FIG. 4 represents a 40% duty cycle or "ON" time for the coil; whereas, the low family of curves represents a 35% duty cycle for the current in coil 82. In both sets of curves in FIG. 4, it will be noted from the legend that the restriction imposed by orifice 78 produces a flattening or less roll-off of the flow curve, with increasing engine manifold vacuum, as compared with the lowest curve representative of prior art devices.

Referring to FIG. 3, an alternative embodiment of the invention is illustrated generally at 110 wherein pole piece 86' received in bobbin 80' of coil 82' has a restrictor orifice 112 formed in the upper end of bore 87' in pole piece 86'. In the embodiment 110 of FIG. 3 it will be understood that the orifice in the end of the boss 70 is thus enlarged to have a diameter greater than the restricting orifice 112.

The present invention thus provides a quick-connect EVR for a vacuum operated fuel vapor purge regulator valve whereby the EVR has a restrictor orifice in the flow outlet to prevent sudden changes in the vacuum signal for the power diaphragm in the regulator valve. Simple changes in the EVR restrictor orifice can accommodate different engine requirements, without retooling the regulator valve.

Although the invention has hereinabove been described with respect to the illustrated embodiments, it will be understood that the invention is capable of modification and variation and is limited only by the following claims.

I claim:

1. A fuel vapor management valve assembly comprising:
   (a) housing structure defining a fluid pressure cavity and including a pressure responsive member operative on one side thereof to define a fluid pressure signal chamber in said cavity and on a side opposite said one side to define a flow regulating pressure chamber in said cavity;
   (b) said housing structure including a signal port communicating with said fluid pressure signal chamber and a fuel vapor inlet port and vapor outlet port communicating with said flow regulating pressure chamber, wherein said pressure responsive member is moveable in response to a pressure difference thereacross for controlling flow between said vapor outlet port and said vapor inlet port;
   (c) said housing structure further including a vent port in said fluid pressure signal chamber; and
   (d) an electrically operated vent valve (EVR) for controlling flow in said vent port, said vent valve having an atmospheric inlet, an outlet and valving member moveable upon electrical energization for controlling flow between said vent valve inlet and outlet, said EVR disposed to provide flow from the outlet thereof to said vent port, wherein said vent valve includes a flow restrictor for restricting flow to said vent port.

2. The valve defined in claim 1, wherein said EVR has said flow restrictor in the outlet thereof.

3. The valve assembly defined in claim 1, wherein said EVR has said flow restrictor provided in the inlet thereof.

4. The valve assembly defined in claim 1, wherein said housing structure includes a recess with said vent port therein; and, said EVR has said outlet port disposed in said recess.

5. A method of making a fuel vapor canister purge valve comprising:
   (a) forming a regulator valve subassembly having a pressure responsive diaphragm and moving the diaphragm in response to a signal pressure on one side thereof and controlling flow from a vapor inlet passage to a vapor outlet passage;
   (b) forming a signal pressure chamber in a housing on said one side of said diaphragm and porting said chamber for connection to an engine inlet manifold and forming a recess in said housing porting said recess to the atmosphere;
   (c) forming a restrictor in the outlet of an electrically operated bleed valve and quick-connecting and sealing said outlet in said recess; and,
   (d) energizing said bleed valve and controlling atmospheric bleed flow to said signal pressure chamber.

6. The method defined in claim 5, wherein said step of forming a recess includes forming a resiliently deflectable tab therein.

7. The method defined in claim 5, wherein said step of quick-connecting includes snap locking.

* * * * *